United States Patent
Parron et al.

(10) Patent No.: US 9,461,685 B2
(45) Date of Patent: Oct. 4, 2016

(54) CONTROLLING SUBSCRIBER IDENTITY MODULE (SIM) ACTIVE STATE IN A MULTIPLE SIMS RADIO

(71) Applicant: INTEL IP CORPORATION, Santa Clara, CA (US)

(72) Inventors: Jerome Parron, Fuerth (DE); Stefan Strobl, Obermichelbach (DE)

(73) Assignee: INTEL IP CORPORATION, Santa Clara, CA (US)

( * ) Notice: Subject to any disclaimer, the term of this patent is extended or adjusted under 35 U.S.C. 154(b) by 33 days.

(21) Appl. No.: 14/517,868

(22) Filed: Oct. 19, 2014

(65) Prior Publication Data

US 2016/0112084 A1   Apr. 21, 2016

(51) Int. Cl.
| | |
|---|---|
| H04B 1/38 | (2015.01) |
| H04W 4/00 | (2009.01) |
| H04B 1/3816 | (2015.01) |
| H04W 76/02 | (2009.01) |
| H04M 1/02 | (2006.01) |

(52) U.S. Cl.
CPC ......... *H04B 1/3816* (2013.01); *H04M 1/0202* (2013.01); *H04W 76/02* (2013.01)

(58) Field of Classification Search
CPC ....... H04W 4/003; H04W 4/08; H04W 4/12; H04W 88/06; H04B 1/005; H04B 1/3816; H04B 1/406; H04M 15/751; H04M 15/7556
USPC ............... 455/550.1, 552.1, 553.1, 557, 558; 370/328, 912, 913
See application file for complete search history.

(56) References Cited

U.S. PATENT DOCUMENTS

| | | | | |
|---|---|---|---|---|
| 8,170,614 B2 * | 5/2012 | Kim | ...... | H04W 8/183 455/558 |
| 8,406,741 B2 * | 3/2013 | Kang | ...... | H04W 8/183 455/558 |
| 8,874,167 B2 * | 10/2014 | Qiu | ...... | H04W 48/18 455/558 |
| 8,908,579 B2 * | 12/2014 | Liu | ...... | H04W 76/048 370/310 |
| 9,167,592 B1 * | 10/2015 | Hsu | ...... | H04W 60/005 |
| 2002/0154632 A1 * | 10/2002 | Wang | ...... | H04W 48/18 370/389 |

OTHER PUBLICATIONS

3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)), 209 pages.
U.S. Appl. No. 14/864,976, filed Sep. 25, 2015, 54 pages.

* cited by examiner

*Primary Examiner* — Quochien B Vuong
(74) *Attorney, Agent, or Firm* — Shichrur & Co.

(57) ABSTRACT

An apparatus, a system and a method of controlling a subscriber identity module (SIM) operation state in a multiple SIMs radio. For example, while operating a first packet switch (PS) service on a first SIM, a multi-SIM radio is configured to receive a PS paging signal indicating on arrival of a second PS service configured to operate on a second SIM. The radio may determine a priority of the first PS service, and a priority of the second PS service. The radio is configured to activate the second SIM, for example, if the priority of the second PS service is higher than the priority of the first PS service operating on the first SIM.

24 Claims, 5 Drawing Sheets

CONTROLLING SUBSCRIBER IDENTITY MODULE (SIM) ACTIVE STATE IN A MULTIPLE SIMS RADIO

TECHNICAL FIELD

Some embodiments described herein generally relate to controlling subscriber identity module (SIM) operation state in a multiple SIMs radio.

BACKGROUND

In a multi-SIM device, e.g., a Smartphone, with one transmitter circuitry, only one SIM can use the transmitter circuitry at a time. When a service operated on one SIM is in use, other services on the alternate SIM(s) are suspended. State of the art is to give preference of circuit switch (CS) based services versus packet switch (PS) based services. An incoming CS service on an alternate SIM may suspend any PS services running on the active SIM. CS preference is due to CS voice service, which is rated as a high priority service.

In contrast, PS based services on the alternate SIM do not interrupt PS based services of the active SIM.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

Reference will now be made to the exemplary embodiments illustrated, and specific language will be used herein to describe the same. It will nevertheless be understood that no limitation of the scope of the disclosure is thereby intended.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a User Equipment (UE), a Mobile Device (MD), an Internet of Things (IoT) device, a desktop computer, a mobile computer, a laptop computer, a notebook computer, a tablet computer, an Ultrabook™ computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a cellular network, a cellular node, a handheld device, e.g., a Smartphone, a Wireless Application Protocol (WAP) device, vending machines, sell terminals, and the like.

The phrases "wireless device" and/or "mobile device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" and/or "mobile device" may optionally include a wireless service.

The term "communicating" as used herein with respect to a wire and/or wireless and/or internal communication signal includes transmitting the communication signal and/or receiving the communication signal. For example, a communication unit, which is capable of communicating a communication signal, may include a transmitter circuitry to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Figure 1:
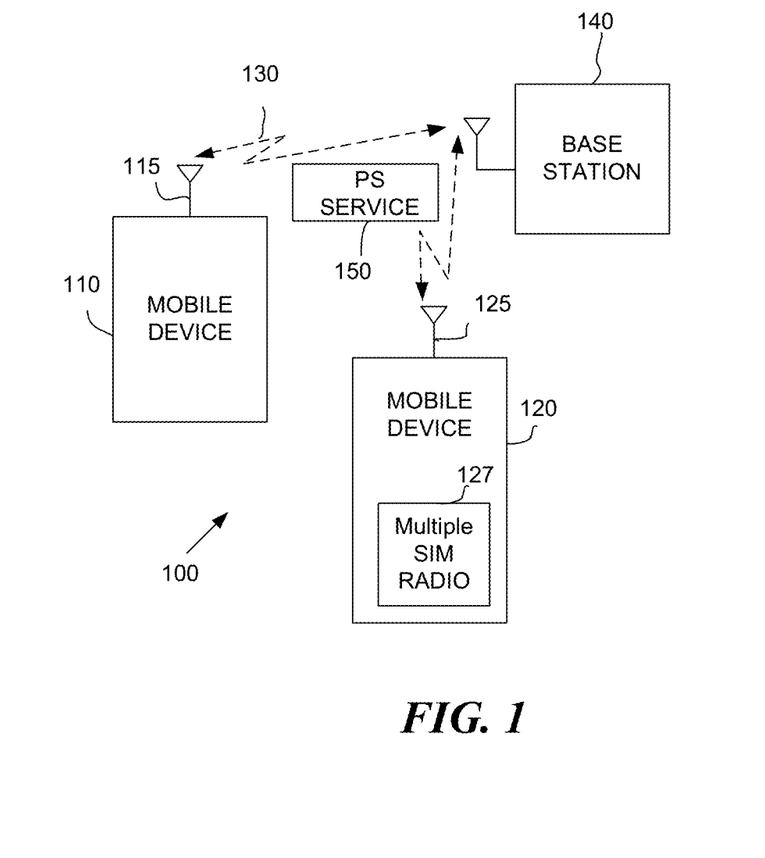
FIG. 1 is a schematic block diagram illustration of a cellular system, in accordance with some demonstrative embodiments.

Reference is made to FIG. 1, which schematically illustrates a cellular system, in accordance with some demonstrative embodiments.

For example, cellular system 100 may include third generation (3G) fourth generation (4G), fifth generation (5G) sixth generation (6G), a long term evolution (LTE) an advance LTE, global system for mobile communications (GSM) cellular networks, or the like.

According to some non-limiting embodiments, for example, mobile device 110 may include an antenna 115, and/or mobile device 120 may include antenna 125. For example mobile devices 110 and/or 120 may include a wireless mobile device such as, for example, a cellphone, a Smartphone, a wearable device, a tablet, a laptop computer, a UE, an Internet of things (IoT) device, and the like.

Base station 140 may establish a PS service 150 with mobile device 110 and/or mobile device 120 through wireless channel(s) 130. For example, base station 140 may include a node B (NB), an enhanced NB (eNB), a home eNB (HeNB) or the like.

According to a non-limiting exemplary embodiment, mobile device 110 and/or mobile device 120 may include a multiple SIMs radio 127 with a transmitter, e.g., a single transmitter, being shared by at least two SIMs. For example the multiple SIMs radio 127 may include, for example, two SIMs. PS service 150 may operate on a single SIM. Some demonstrative embodiments are described herein with respect to a multiple SIMs radio including two SIMs. However, in other embodiments, the multiple SIMs radio may include any other number of SIMs.

In some demonstrative embodiments, multiple SIMs radio 127 may be configured to switch between the multiple SIMs based on a priority of PS 150, e.g., as described below.

In some demonstrative embodiments, the multiple SIMs radio 127 may switch between the SIMs, for example, when a higher priority PS service is received from base station 140 through wireless channel 130 for the second SIM, e.g., while an ongoing PS service with a lower priority is operating on the first SIM, e.g., as described below.

In some demonstrative embodiments, a voice-based PS may be given higher priority, e.g., over PS services, which are not voice-based. In other embodiments, the priority of the PS service may be defined according to any other additional or alternative criteria.

In one example, with the introduction of IP Multimedia Subsystem (IMS) voice services over PS, voice services running over PS may be given preference over other PS services.

In some demonstrative embodiments, the multiple SIMs radio 127 may be configured to identify PS services, e.g., to determine if an oncoming PS service shall take precedence on other PS services.

Figure 2:
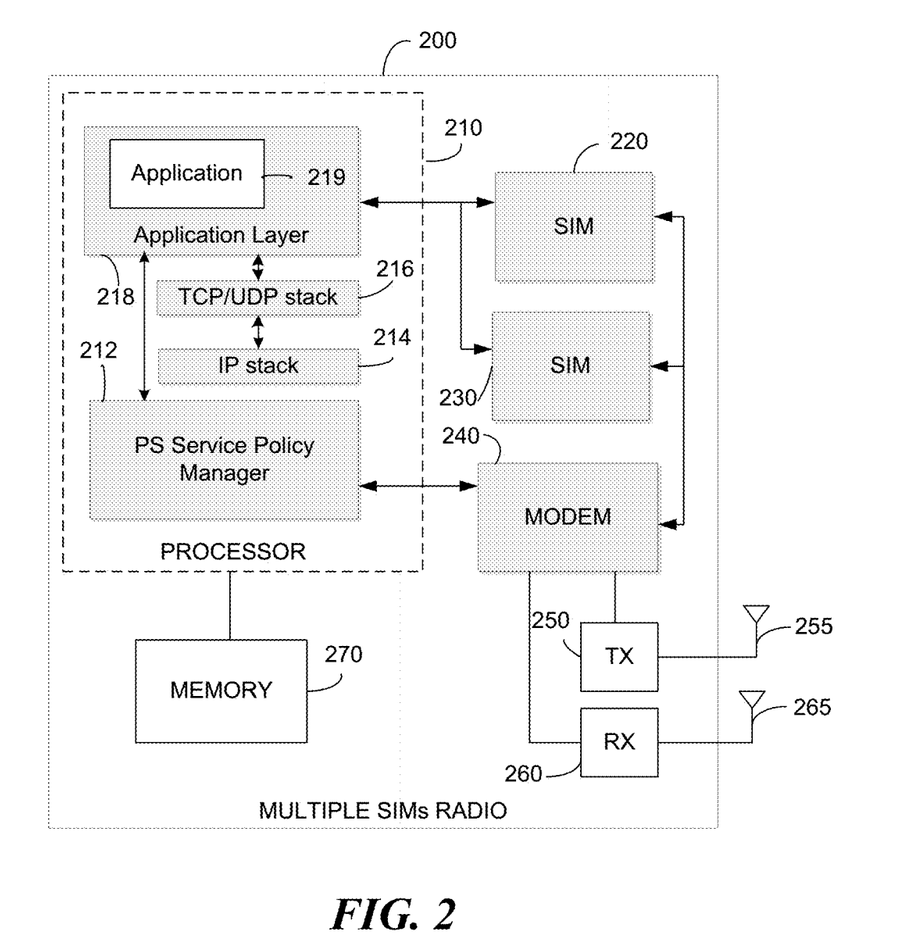
FIG. 2 is a schematic block diagram illustration of a multiple SIMs radio, in accordance with some demonstrative embodiments.

Reference is made to FIG. 2, which schematically illustrates a multiple SIMs radio 200, in accordance with some demonstrative embodiments. For example, multiple SIMs radio 200 may perform the functionality of multiple SIMs radio 127 (FIG. 1).

In some demonstrative embodiments, multiple SIMs radio 200 may include a processor circuitry and/or logic 210, a SIM circuitry and/or logic 220, a SIM circuitry and/or logic 230, a modem circuitry and/or logic 240, a transmitter (TX) circuitry and/or logic 250 operably coupled to at least one antenna 255, a receiver (RX) circuitry and/or logic 260 operably coupled to at least one antenna 265, and a memory circuitry and/or logic 270.

According to some embodiments, processor circuitry and/or logic 210 may include a PS service policy manager logic and/or circuitry 212, an Internet Protocol (IP) protocol stack logic 214, a Transmission Control Protocol/User Datagram Protocol (TCP/UDP) protocol stack logic 216, and an application layer logic 218 which may include an application 219.

According to some demonstrative embodiments, modem circuitry and/or logic 240 may include a 3G and/or 4G and/or 5G and/or 6G cellular modem such as, for example, an LTE and/or LTE advance cellular modem. Antennas 255 and/or 266 may include one or more antennas, for example, an antenna array, a dipole antenna, an internal antenna, a phase array antenna, or the like. Memory circuitry and/or logic 270 may include for example, a FLASH memory, a Read Only Memory (ROM), a Random Access Memory (RAM) a Dynamic RAM (DRAM), a static RAM (SRAM) a solid state memory and/or any type of a volatile memory and/or a non-volatile memory.

For example, PS service 150 (FIG. 1) may operate on a first SIM ("the active SIM"), e.g., SIM 220, which is operably coupled to transmitter circuitry and/or logic 250, while a second SIM ("the inactive SIM"), e.g., SIM 230, may be disconnected to transmitter circuitry and/or logic 250.

In some demonstrative embodiments, multiple SIMs radio 200 may detect a type of incoming PS services (may also be referred to as "mobile terminated PS services") or outgoing PS services (may also be referred to as "mobile originated PS services"), which are to be set up on an alternate SIM, e.g., SIM 230, while another PS service is ongoing on an active SIM e.g., SIM 220.

In some demonstrative embodiments, a configured policy may determine if an upcoming PS service on the alternate SIM, e.g., SIM 230, has higher priority than the ongoing PS service on the active SIM, e.g., SIM 220.

In some demonstrative embodiments, multiple SIMs radio 200 may be configured to activate the alternate SIM, e.g., SIM 230, to connect the alternate SIM to transmitter circuitry or logic 250 for PS service setup of the upcoming PS service, and to disconnect SIM 220 from transmitter circuitry and/or logic 250.

In some demonstrative embodiments, while a first PS service is operating on SIM 220, receiver circuitry and/or logic 260 may receive a PS paging signal. The PS paging signal may indicate an arrival of a second PS service, e.g., to be operated by SIM 230. PS service policy manger circuitry 212 may determine a first PS service priority of the first PS service, and a second PS service priority of the second PS service. If, for example, the priority of the second PS service is higher than the priority of the first PS service operating at SIM 220, PS service policy manger circuitry 212 may detach SIM 220 from transmitter circuitry 250, may connect SIM 230 to transmitter circuitry 250, may activate SIM 230, and may suspend SIM 220, if desired.

In some demonstrative embodiments, PS service policy manger circuitry 212 may use one or more detection methods to determine the priority of a PS service, e.g., PS service 150. For example, PS service policy manger circuitry 212 may use one or more detection methods described below.

In one demonstrative embodiment, PS service policy manger circuitry 212 may inspect the content of the PS paging signal of a PS service, e.g., the first or the second PS service described above, and may detect the type of the PS service, based on the content of the PS paging signal. For example, the PS paging message may include a service description field, and the content of the service description field may include a voice service indicator, if desired.

In another demonstrative embodiment, PS service policy manger circuitry 212 may detect the type of a PS service, e.g., the first or the second PS service described above, based on data radio bearer (DRB) identification (ID), and/or an evolved packed system (EPS) context ID, and/or packed data protocol (PDP) context ID. In one example, PS service policy manger 212 may set a radio resource control (RRC) connection with a base station, e.g., base station 140 (FIG. 1), to identify receiving of a user data and to determine a priority of an incoming PS service, e.g., based on the content of the user data. After setup of the RRC connection, IP protocol stack logic 214 and/or TCP/UDP protocol stack logic 216 may identify on which DRB, EPS/PDP context ID the user data is received. The priority of the incoming PS service may be determined, for example, based on the priority associated with the EPS/PDP context ID.

For example, the PS service priority may be determined based on at least one of a source IP address, a source port, a destination port, a transport protocol e.g., UPD, TCP, a session protocol e.g., SIP or the like. The criteria on which parameter(s) to select to determine the priority may be configured, for example, by a user application 219 and/or by the user, and/or by a device manufacturer, and/or by the cellular network operator or the like.

In one example, detecting the priority of a SP service may be based on criteria set by a user application 219. For example, IP multimedia subsystem (IMS) signaling messages may come from an IMS-Proxy—Call Session Control Function (PCSCF) whose source IP address may be known. An incoming IP packet with the IP source address set to the one of the IMS-PCSCF may be related to IMS. The incoming IMS service may be prioritized accordingly.

In another demonstrative embodiment, PS service policy manger 212 may detect the PS service, e.g., PS service 150, at a modem circuitry and/or logic 240 or at application layer logic 218, e.g., without interrupting the ongoing PS service on the active SIM.

For example, an ongoing PS service at modem 240 may be detected based on the PDP/EPS context used to send the data. For example, an access point name (APN) of the EPS context used to transmit the data may be used to identify the PS service. For example, for IMS service, the PDP/EPS context may be identified with the IMS APN. In another example, detecting the ongoing PS service at the modem may be done by inspecting the received IP packet. The PS service detection may be based on source/destination IP address, source/destination port, protocol type, etc., which may be present in the IP packet. For example, when an IP packet for the alternate (suspended) SIM has to be transmitted, the destination IP address set in the IP packet may be used to identify the corresponding PS service/application, if desired.

In another demonstrative embodiment, the detection of the PS service may be performed at the application layer logic. For example, the PS service detection may be based on the operating system specific application ID (OSAppId) or on a fully qualified domain name (FQDN), if desired.

For example, PS service policy manager 212 may include a list of PS service detection criteria, and the PS service detection may be based on one or more of, e.g., a combination of two or more of, but not limited to, the following parameters: APN, EPS/PDP context ID, Source/destination IP address, Source/destination port, OS specific application ID, and the like.

Figure 3:
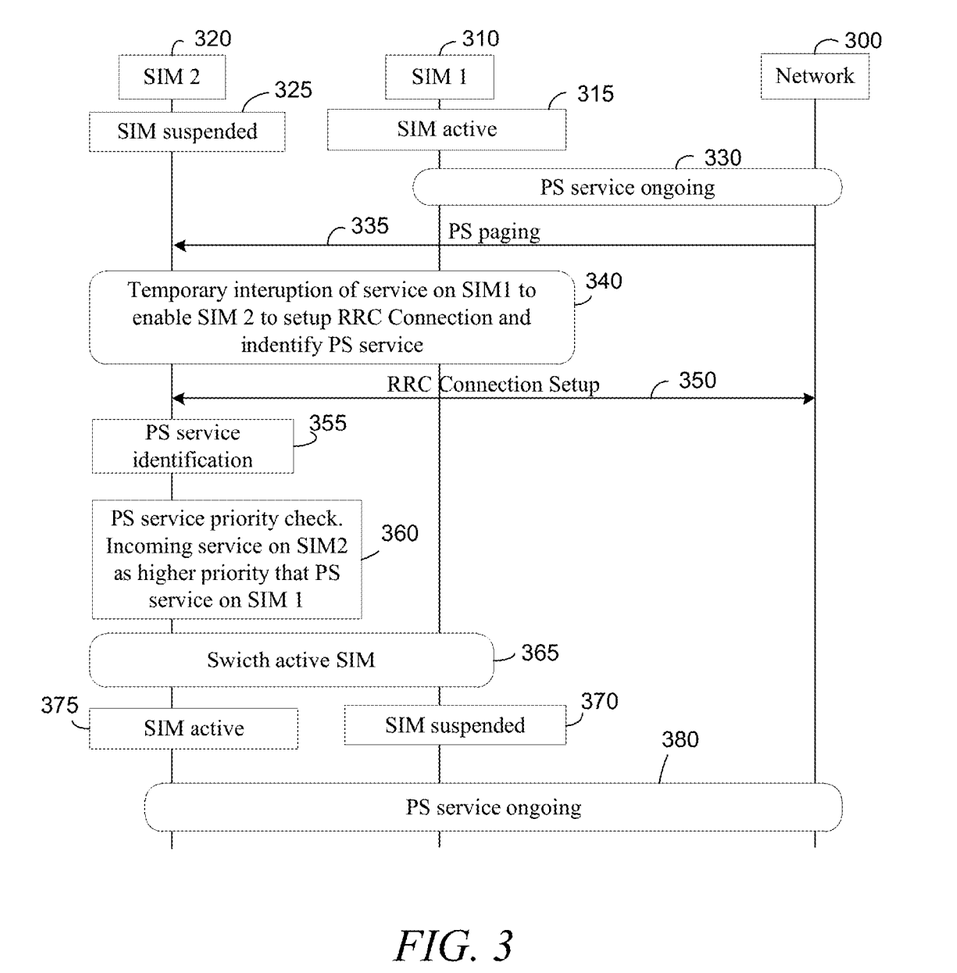
FIG. 3 is a schematic illustration of a method of controlling a SIM operation state in a multiple SIMs radio, in accordance with some demonstrative embodiments.

Reference is made to FIG. 3, which schematically illustrates a method of controlling a SIM operation state in a multiple SIMs radio, in accordance with some demonstrative embodiments. In some demonstrative embodiments, one or more of the operations of the method of FIG. 3 may be performed by a multiple SIMs radio, e.g., multiple SIMs radio 200 (FIG. 2).

As shown in FIG. 3, a SIM-1 310 is active (text box 315), a SIM-2 320 is suspended (text box 325), and a PS service is ongoing (text box 330) between SIM-1 310 and a network 300, e.g., a cellular network. While operating a PS service on SIM-1 310, SIM-2 320 may receive a PS paging signal 335 indicating on arrival of a new PS service configured to operate on SIM-2 320.

For example, a PS service policy manager, e.g., PS policy manager 212 (FIG. 2) of multiple SIMs radio 200 (FIG. 2), may temporary interrupt the service on SIM-1 310, e.g., to enable SIM-2 320 to set up an RRC connection and identify the new PS service (text box 340). After RRC connection setup 335, the PS service policy manger, for example, may identify the PS service type (text box 355), and may determine the new PS service priority and the ongoing PS service priority (text box 360).

In some demonstrative embodiments, if the priority of the new PS service is higher than the priority of the ongoing PS service, the PS service policy manager may switch active SIM (text box 365). For example, the PS service policy manager may switch SIM-2 to become the active SIM (text box 375), and SIM-1 310 to be suspended (text box 370). A new ongoing PS service may be setup between SIM-2 320 and network 320 (text box 380).

Figure 4:
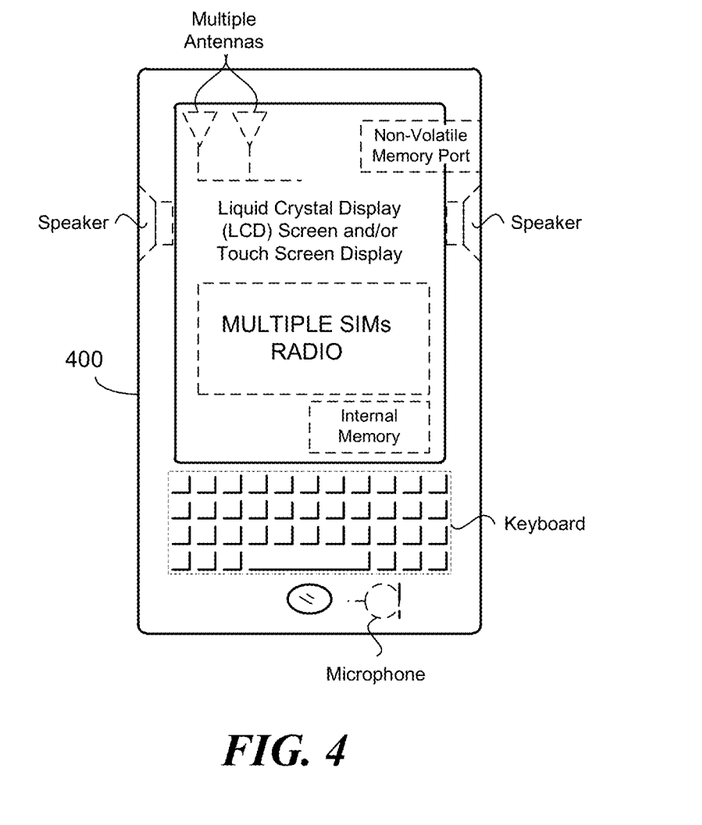
FIG. 4 is a schematic illustration of a mobile device with a multiple SIMs radio, in accordance with some demonstrative embodiments.

Reference is made to FIG. 4, which schematically illustrates a mobile device 400 with a multiple SIMs radio, e.g., multiple SIMs radio 200 (FIG. 2), in accordance with some demonstrative embodiments The mobile device 400 may include, for example, a user equipment (UE), a mobile station (MS), a mobile wireless device, a cell phone, a Smartphone, a mobile communication device, a tablet, a handset, or other type of mobile wireless device. The mobile device 400 may include one or more antennas configured to communicate with a transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device 400 may be configured to communicate using at least one wireless communication standard including 3GPP LTE, 3GPP UMTS, GSM, WiMAX, High Speed Packet Access (HSPA), Bluetooth, and WiFi. The mobile device may communicate using separate antennas for each wireless communication standard or shared antennas for multiple wireless communication standards. The mobile device 400 may communicate in a WLAN, a wireless personal area network (WPAN), and/or a WWAN. In some demonstrative embodiments, mobile device 400 may perform the functionality of mobile device 110 and/or 120 (FIG. 1).

FIG. 4 also provides an illustration of a microphone and one or more speakers that may be used for audio input and output from the mobile device. The display screen may be a liquid crystal display (LCD) screen, or other type of display screen such as an organic light emitting diode (OLED)

display. The display screen can be configured as a touch screen. The touch screen may use capacitive, resistive, or another type of touch screen technology. A multiple SIMs radio, e.g., multiple SIMs radio 200 (FIG. 2), may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as, for example CD-ROMs, hard drives, Solid-State Drives (SSD), non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor circuitry, a storage medium readable by the processor circuitry (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 5:
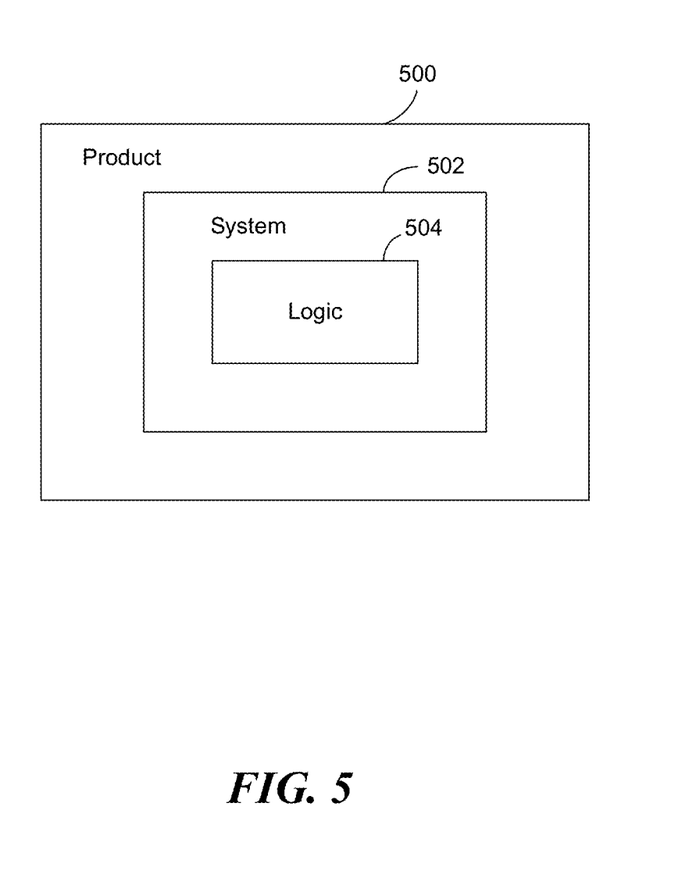
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of one or more elements of system 100 (FIG. 1), one or more elements of multiple SIMs radio 200 (FIG. 2) and/or to perform one or more operations of the method of FIG. 3. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

EXAMPLES

The following examples pertain to further embodiments.

Example 1 includes a method of controlling a subscriber identity module (SIM) operation state in a multiple SIMs radio, the method comprising while operating a first packet switch (PS) service on a first SIM, receiving a second PS service configured to operate on a second SIM; determining a priority of the first PS service, and a priority of the second PS service; and activating the second SIM, if the priority of the second PS service is higher than the priority of the first PS service.

Example 2 includes the subject matter of Example 1, and optionally, wherein activating the second SIM comprises suspending the first PS service at the first SIM; detaching the first SIM from a transmitter circuitry; and connecting the second SIM to the transmitter circuitry.

Example 3 includes the subject matter of Example 1 comprising detecting a type of the first PS service, and determining the priority of the first PS service based on the type of the first PS service; and detecting a type of the second PS service, and determining the priority of the second PS service based on the type of the second PS service.

Example 4 includes the subject matter of Example of any one of Examples 1-3, and optionally, wherein the second PS service comprises an incoming PS service, the method comprises receiving a PS paging signal indicating arrival of the second PS service; detecting a type of the second PS service based on a content of the PS paging signal; and determining the priority of the second PS service based on the type of the second PS service.

Example 5 includes the subject matter of Example 4, and optionally, comprising detecting the type of the second PS service based on a data radio bearer (DRB) identification (ID).

Example 6 includes the subject matter of Example 4, and optionally, comprising setting a radio resource control connection (RRC) with a base station; identifying reception of a user data; and determining a priority of the incoming PS service based on content of the user data.

Example 7 includes the subject matter of Example 4, and optionally, comprising detecting a type of the first PS service or the second PS service based on inspection of a first received data packet in the multiple SIMs radio, and determining the priority of the first PS service or the priority of the second PS service based on the type of the first PS service or the second PS service.

Example 8 includes the subject matter of Example 4, and optionally, comprising setting a radio resource control connection (RRC) with a base station; receiving an Internet Protocol (IP) packet; and inspecting the IP packet to determine the priority of the second PS service based on at least one parameter selected from a group consisting of a source IP address, a source port, a destination port, a transport protocol and a session protocol.

Example 9 includes the subject matter of any one of Examples 1-3, and optionally, wherein at least one PS service selected from the group consisting of the first PS service and the second PS service comprises an ongoing PS service, the method comprising detecting a priority of the ongoing PS service based on a type of the ongoing PS service.

Example 10 includes the subject matter of Example 9, and optionally, comprising detecting the priority of the ongoing PS service at a modem.

Example 11 includes the subject matter of Example 9, and optionally, comprising detecting the priority of the ongoing PS service at an application layer logic by a processor circuitry.

Example 12 includes a multiple subscriber identity module (SIM)s radio configured to control a SIM operation state, the multiple SIMs radio comprising transmitter circuitry configured to transmit communications of an active packet switch (PS) service; receiver circuitry configured to receive communications of the active PS service; and processor circuitry configured to determine a priority of a first PS service operating on a first SIM and a priority of a second PS service to operate on a second SIM, and to activate the second PS service and suspend the first PS service, if the priority of the second PS service is higher than the priority of the first PS service.

Example 13 includes the subject matter of Example 12, and optionally, wherein the processor circuitry is configured to detach the first SIM from the transmitter circuitry and to connect the second SIM to the transmitter circuitry.

Example 14 includes the subject matter of Example 12, and optionally, wherein the processor circuitry is configured to detect a type of the first PS service and to determine the priority of the first PS service based on the type of the first PS service, and to detect a type of the second PS service and to determine the priority of the second PS service based on the type of the second PS service.

Example 15 includes the subject matter of any one of Examples 12-14, and optionally, wherein the receiver circuitry is configured to receive a PS paging signal indicating arrival of the second PS service, the processor circuitry being configured to detect a type of the second PS service based on the PS paging signal content, and to determine the priority of the second PS service based on the type of the second PS service.

Example 16 includes the subject matter of Example 15, and optionally, wherein the processor circuitry is configured to detect the type of the second PS service based on a data radio bearer (DRB) identification (ID), and to determine the priority of the second PS service based on the type of the second PS service.

Example 17 includes the subject matter of Example 15, and optionally, wherein the processor circuitry is configured to set a radio resource control connection (RRC) with a base station, to identify a reception of a user data, and to determine a priority of an incoming PS service based on the content of the user data.

Example 18 includes the subject matter of Example 15, and optionally, wherein the processor circuitry is configured to detect the type of the second PS service based on inspection of a first received data packet.

Example 19 includes the subject matter of Example 15, and optionally, wherein the processor circuitry is configured to set a radio resource control connection (RRC) with a base station, to receive an Internet Protocol (IP) packet, to inspect the IP packet and to determine the priority of the second PS service based on at least one parameter selected from the group consisting of a source IP address, a source port, a destination port, a transport protocol and a session protocol.

Example 20 includes the subject matter of Example 12, and optionally, wherein the processor circuitry is configured to detect a priority of an ongoing PS service based on the type of the ongoing PS service.

Example 21 includes the subject matter of Example 20, and optionally, wherein the processor is configured to detect the priority of the ongoing PS service at a modem.

Example 22 includes the subject matter of Example 20, and optionally, wherein the processor circuitry is configured to detect the priority of the ongoing PS service at an application layer.

Example 23 includes a multiple subscriber identity module (SIM)s radio configured to control a SIM operation state, the multiple SIMs radio comprising a transmitter circuitry to be operably coupled to a first SIM or to a second SIM, the transmitter circuitry configured to transmit communications of an active packet switch (PS) service; at least two dipole antennas operably coupled to the transmitter circuitry; a receiver circuitry configured to receive communications of the active PS service; and processor circuitry configured to determine a priority of a first PS service operating on the first SIM and a priority of a second PS service to operate on the second SIM, and to activate the second PS service and suspend the first PS service, if the priority of the second PS service is higher than the priority of the first PS service.

Example 24 includes the subject matter of Example 23, and optionally, wherein the processor circuitry is configured to detach the first SIM from the transmitter circuitry and to connect the second SIM to the transmitter circuitry.

Example 25 includes the subject matter of Example 23, and optionally, wherein the processor circuitry is configured to detect a type of the first PS service and to determine the priority of the first PS service based on the type of the first PS service, and to detect a type of the second PS service and to determine the priority of the second PS service based on the type of the second PS service.

Example 26 includes the subject matter of any one of Examples 23-25, and optionally, wherein the receiver circuitry is configured to receive a PS paging signal indicating arrival of the second PS service, the processor circuitry being configured to detect the type of the first or the second PS service based on content of the PS paging signal, and to determine the priority of the second PS service based on the type of the second PS service.

Example 27 includes the subject matter of any one of Examples 23-25, and optionally, wherein the processor circuitry is configured to detect a type of the second PS service based on a data radio bearer (DRB) identification (ID), and to determine the priority of the second PS service based on the type of the second PS service.

Example 28 includes the subject matter of Example 26, and optionally, wherein the processor circuitry is configured to set a radio resource control connection (RRC) with a base station, to identify a reception of a user data and to determine a priority of an incoming PS service based on the content of the user data.

Example 29 includes the subject matter of Example 26, and optionally, wherein the processor circuitry is configured to detect the type of the second PS service based on inspection of a first received data packet.

Example 30 includes the subject matter of any one of Examples 23-25, and optionally, wherein the processor circuitry is configured to set a radio resource control connection (RRC) with a base station, to receive an Internet Protocol (IP) packet, to inspect the IP packet, and to determine the priority of the second PS service based on at least one parameter selected from the group consisting of a source IP address, a source port, a destination port, a transport protocol and a session protocol.

Example 31 includes the subject matter of any one of Examples 23-25, and optionally, wherein the processor circuitry is configured to detect a priority of an ongoing PS based on the type of the ongoing PS service.

Example 32 includes the subject matter of Example 31, and optionally, wherein the processor circuitry is configured to detect the priority of the ongoing PS service at a modem circuitry.

Example 33 includes the subject matter of Example 31, and optionally, wherein the processor circuitry is configured to detect the priority of the ongoing PS service initiation at an application layer logic.

Example 34 includes a cellular system comprising a multiple subscriber identity module (SIM)s radio configured to control a SIM operation state, the multiple SIMs radio comprises transmitter circuitry configured to transmit communications of an active packet switch (PS) service; receiver circuitry configured to receive communications of the active PS service; and processor circuitry configured to determine a priority of a first PS service operating on a first SIM and a priority of a second PS service to operate on a second SIM, and to activate the second PS service and suspend the first PS service, if the priority of the second PS service is higher than the priority of the first PS service.

Example 35 includes the subject matter of Example 34, and optionally, wherein the processor circuitry is configured to detach the first SIM from the transmitter circuitry and to connect the second SIM to the transmitter circuitry.

Example 36 includes the subject matter of Example 34, and optionally, wherein the processor circuitry is configured to detect a type of the first PS service and to determine the priority of the first PS service based on the type of the first PS service, and to detect a type of the second PS service and to determine the priority of the second PS service based on the type of the second PS service.

Example 37 includes the subject matter of any one of Examples 34-36, and optionally, wherein the receiver circuitry is configured to receive a PS paging signal indicating arrival of the second PS service, the processor circuitry being configured to detect the type of the second PS based on content of the PS paging signal, and to determine the priority of the second PS service based on the type of the second PS service.

Example 38 includes the subject matter of any one of Examples 34-36, and optionally, wherein the processor circuitry is configured to detect a type of the first or the second PS service based on a data radio bearer (DRB) identification (ID), and to determine the priority of the second PS service based on the type of the second PS service.

Example 39 includes the subject matter of Example 37, and optionally, wherein the processor circuitry is configured to set a radio resource control connection (RRC) with a base station, to identify a reception of a user data, and to determine a priority of an incoming PS service based on the content of the user data.

Example 40 includes the subject matter of Example 37, and optionally, wherein the processor circuitry is configured to detect the type of the second PS service based on inspection of a first received data packet.

Example 41 includes the subject matter of any one of Examples 34-36, and optionally, wherein the processor circuitry is configured to set a radio resource control connection (RRC) with a base station, to receive an Internet Protocol (IP) packet, to inspect the IP packet and to determine the priority of the second PS service based on at least one parameter selected from the group consisting of a source IP address, a source port, a destination port, a transport protocol and a session protocol.

Example 42 includes the subject matter of Example 34-36, and optionally, wherein the processor circuitry is configured to detect a priority of an ongoing PS service based on the type of the ongoing PS service.

Example 43 includes the subject matter of Example any one of Examples 42, and optionally, wherein the processor circuitry is configured to detect the ongoing PS service at a modem.

Example 44 includes the subject matter of Example 42, and optionally, wherein the processor circuitry is configured to detect the ongoing PS service at an application layer logic.

Example 45 includes a processor circuitry configured to control a subscriber identity module (SIM) operation state at a multiple SIMs radio, the processor circuitry comprising an application layer logic to include a user application; and a packet switch (PS) service policy manger logic configured to determine a priority of a first PS service operating on a first SIM and a priority of a second PS service to operate on a second SIM, and to activate the second PS service and suspend the first PS service, if the priority of the second PS service is higher than the priority of the first PS service.

Example 46 includes the subject matter of Example 45, and optionally, wherein the PS service policy manger is configured to detach the first SIM from the transmitter circuitry and to connect the second SIM to the transmitter circuitry.

Example 47 includes the subject matter of Example 45, and optionally, wherein the PS service policy manger is configured to detect a type of the first PS service and to determine the priority of the first PS service based on the type of the first PS service, and to detect a type of the second PS service and to determine the priority of the second PS service based on the type of the second PS service.

Example 48 includes the subject matter of Example 45, and optionally, wherein the second PS service includes an incoming PS service, the PS service policy manger is configured to detect the type of the second PS based on a PS paging signal content.

Example 49 includes the subject matter of Example 48, and optionally, comprising a Transmission Control Protocol/User Datagram Protocol (TCP/UDP) protocol stack logic configured to identify reception of the incoming PS service at an access point name (APN) of an evolved packet system (EPS) data radio bearer (DRB) identification (ID), after setting up a radio resource control connection (RRC) with a base station, the PS service policy manger being configured detect a type of the second PS based on the DRB identification.

Example 50 includes the subject matter of Example 48, and optionally, wherein the PS service policy manger is configured set a radio resource control connection (RRC) with a base station, to identify a receiving of a user data, and to determine a priority of the incoming PS service based on content of the user data.

Example 51 includes the subject matter of Example 48, and optionally, wherein the PS service policy manger is configured detect the type of the incoming PS service based on inspecting a first received data packet.

Example 52 includes the subject matter of Example 45, and optionally, comprising an Internet protocol stack logic configured to inspect a received Internet Protocol (IP) packet for a source IP address, a source port, a destination port, a transport protocol and a session protocol, wherein the PS service policy manger is configured to determine the PS service priority based on at least one parameter selected from the group consisting of the source IP address, the source port, the destination port, the transport protocol and the session protocol.

Example 53 includes the subject matter of Example 45, and optionally, wherein the first PS service includes an ongoing PS service, the PS service policy manger being configured detect the priority of the first service based on a type of the first PS service.

Example 54 includes the subject matter of Example 53, and optionally, wherein the PS service policy manger is configured detect the ongoing PS service at a modem.

Example 55 includes the subject matter of Example 53, and optionally, wherein the PS service policy manger is configured detect the ongoing PS service at the application layer logic.

Example 56 includes a computer program product comprising one or more tangible computer readable non-transitory storage media comprising computer-executable instructions operable to, when executed by at least one computer processor, enable the at least one computer processor to implement a method in a multiple SIMs radio, the method comprising while operating a first packet switch (PS) service on a first SIM, receiving a second PS service configured to operate on a second SIM; determining a priority of the first PS service, and a priority of the second PS service; and activating the second SIM, if the priority of the second PS service is higher than the priority of the first PS service.

Example 57 includes the subject matter of Example 56, and optionally, wherein activating the second SIM comprises suspending the first PS service at the first SIM; detaching the first SIM from a transmitter circuitry; and connecting the second SIM to the transmitter circuitry.

Example 58 includes the subject matter of Example 56, and optionally, wherein the method comprises detecting a type of the first PS service, and determining the priority of the first PS service based on the type of the first PS service; and detecting a type of the second PS service, and determining the priority of the second PS service based on the type of the second PS service.

Example 59 includes the subject matter of any one of Examples 56-58, and optionally, wherein the second PS service comprises an incoming PS service, the method comprising receiving a PS paging signal indicating arrival of the second PS service; detecting a type of the second PS service based on a content of the PS paging signal; and determining the priority of the second PS service based on the type of the second PS service.

Example 60 includes the subject matter of any one of Examples 56-58, and optionally, wherein the method comprises detecting the type of the second PS is based on a data radio bearer (DRB) identification (ID), and determining the priority of the second PS service based on the type of the second PS service.

Example 61 includes the subject matter of Example 59, and optionally, wherein the method comprises setting a radio resource control connection (RRC) with a base station; identifying reception of a user data; and determining a priority of the incoming PS service based on content of the user data.

Example 62 includes the subject matter of Example 59, and optionally, wherein the method comprises detecting a type of the first PS service or the second PS service based on inspection of a first received data packet in the multiple SIMs radio, and determining the priority of the first PS service or the priority of the second PS service based on the type of the first PS service or the second PS service.

Example 63 includes the subject matter of Example 59, and optionally, wherein inspecting comprises setting a radio resource control connection (RRC) with a base station; receiving an Internet Protocol (IP) packet; and inspecting the IP packet to determine the priority of the second PS service based on at least one of parameter selected from the group consisting a source IP address, a source port, a destination port, a transport protocol and a session protocol.

Example 64 includes the subject matter of any one of Examples 56-58, and optionally, wherein at least one PS service selected from the group consisting of the first PS service and the second PS service comprises an ongoing PS service, the method comprising detecting a priority of the ongoing PS service based on a type of the ongoing PS service.

Example 65 includes the subject matter of Example 64, and optionally, wherein the detecting the priority of the ongoing PS service is done at a modem.

Example 66 includes the subject matter of Example 64, and optionally, wherein the detecting the priority of the ongoing PS service is done at an application layer logic.

Example 67 includes a multiple subscriber identity module (SIM)s radio configured to control a SIM operation state, the multiple SIMs radio comprising transmitter means configured to transmit communications of an active packet switch (PS) service; receiver means configured to receive communications of the active PS service; and processor means configured to determine a priority of a first PS service operating on a first SIM and a priority of a second PS service to operate on a second SIM, and to activate the second PS service and suspend the first PS service, if the priority of the second PS service is higher than the priority of the first PS service.

Example 68 includes the subject matter of Example 67, and optionally, wherein the processor means is configured to detach the first SIM from the transmitter circuitry and to connect the second SIM to the transmitter circuitry.

Example 69 includes the subject matter of Example 67, and optionally, wherein the processor means is configured to detect a type of the first PS service and to determine the priority of the first PS service based on the type of the first PS service, and to detect a type of the second PS service and to determine the priority of the second PS service based on the type of the second PS service.

Example 70 includes the subject matter of any one of Examples 67-69, and optionally, wherein the receiver means is configured to receive a PS paging signal indicating arrival of the second PS service, the processor means being configured to detect a type of the second PS based on the PS paging signal content, and to determine the priority of the second PS service based on the type of the second PS service.

Example 71 includes the subject matter of any one of Examples 67-69, and optionally, wherein the processor means is configured to detect a type of the second PS service based on a data radio bearer (DRB) identification (ID), and to determine the priority of the second PS service based on the type of the second PS service.

Example 72 includes the subject matter of Example 70, and optionally, wherein the processor means is configured to set a radio resource control connection (RRC) with a base station, to identify a reception of a user data, and to determine a priority of an incoming PS service based on content of the user data.

Example 73 includes the subject matter of Example 70, and optionally, wherein the processor means is configured to detect the type of the second PS service based on inspection of a first received data packet.

Example 74 includes the subject matter of any one of Examples 67-69, and optionally, wherein the processor means is configured to set a radio resource control connection (RRC) with a base station, to receive an Internet Protocol (IP) packet, to inspect the IP packet, and to determine the priority of the second PS service based on at least one parameter selected from the group consisting of a source IP address, a source port, a destination port, a transport protocol and a session protocol.

Example 75 includes the subject matter of any one of Examples 67-69, and optionally, wherein the processor means is configured to detect a priority of an ongoing PS service based on a type of the ongoing PS service.

Example 76 includes the subject matter of Example 75, and optionally, wherein the processor means is configured to detect the priority of the ongoing PS service at a modem.

Example 77 includes the subject matter of Example 75, and optionally, wherein the processor means is configured to detect the priority of the ongoing PS service at an application layer.

Example 78 includes a processor circuitry configured to control a subscriber identity module (SIM) operation state at a multiple SIMs radio, the processor circuitry comprising application layer means to include a user application; and packet switch (PS) service policy manger means configured to determine a priority of a first PS service operating on a first SIM and a priority of a second PS service to operate on a second SIM, and to activate the second PS service and suspend the first PS service, if the priority of the second PS service is higher than the priority of the first PS service.

Example 79 includes the subject matter of Example 78, and optionally, wherein the PS service policy manger means is configured to detect a type of the first PS service and to determine the priority of the first PS service based on the type of the first PS service, and to detect a type of the second PS service and to determine the priority of the second PS service based on the type of the second PS service.

Example 80 includes the subject matter of Example 78 or 79, and optionally, wherein the second PS service includes an incoming PS service, the PS service policy manger means is configured to detect the type of the second PS based on a PS paging signal content.

Example 81 includes the subject matter of Example 80, and optionally, comprising Transmission Control Protocol/User Datagram Protocol (TCP/UDP) protocol stack means configured to identify reception of the incoming PS service at an access point name (APN) of an evolved packet system (EPS) data radio bearer (DRB) identification (ID), after setting up a radio resource control connection (RRC) with a base station, the PS service policy manger means being configured to detect a type of the incoming PS service based on the DRB identification.

Example 82 includes the subject matter of Example 80, and optionally, comprising Internet protocol stack means configured to inspect a received Internet Protocol (IP) packet for a source IP address, a source port, a destination port, a transport protocol, and a session protocol; and the PS service policy manger means is configured to determine the PS service priority based on at least one parameter selected from the group consisting of the source IP address, the source port, the destination port, the transport protocol, and the session protocol.

Example 83 includes the subject matter of Example 78 or 79, and optionally, wherein the first PS service includes an ongoing PS service, the PS service policy manger means being configured detect the priority of the first service based on a type of the first PS service.

Example 84 includes the subject matter of Example 83, and optionally, wherein the PS service policy manger means is configured to detect the ongoing PS service at a modem.

Example 85 includes the subject matter of Example 83, and optionally, wherein the PS service policy manger means is configured to detect the ongoing PS service at the application layer logic.

Example 86 includes a computer program product comprising one or more tangible computer readable non-transitory storage media comprising computer-executable instructions operable to, when executed by at least one computer processor, enable the at least one computer processor to implement a method in a multiple SIMs radio, the method comprising while operating a first packet switch (PS) service on a first SIM, receiving a second PS service configured to operate on a second SIM; determining a priority of the first PS service, and a priority of the second PS service; and activating the second SIM, if the priority of the second PS service is higher than the priority of the first PS service.

Example 87 includes the subject matter of Example 86, and optionally, wherein activating the second SIM comprises suspending the first PS service at the first SIM; detaching the first SIM from a transmitter circuitry; and connecting the second SIM to the transmitter circuitry.

Example 88 includes the subject matter of Example 86, and optionally, wherein the method comprises detecting a type of the first PS service, and determining the priority of the first PS service based on the type of the first PS service; and detecting a type of the second PS service, and determining the priority of the second PS service based on the type of the second PS service.

Example 89 includes the subject matter of any one of Examples 86-88, and optionally, wherein the second PS service comprises an incoming PS service, the method comprising receiving a PS paging signal indicating arrival of the second PS service; detecting a type of the second PS service based on a content of the PS paging signal; and determining the priority of the second PS service based on the type of the second PS service.

Example 90 includes the subject matter of Example 89, and optionally, comprising setting a radio resource control connection (RRC) with a base station; receiving an Internet Protocol (IP) packet; and inspecting the IP packet to determine the priority of the second PS service based on at least one parameter selected from the group consisting of a source IP address, a source port, a destination port, a transport protocol, and a session protocol.

Example 91 includes the subject matter of any one of Examples 86-88, and optionally, wherein at least one PS service selected from the group consisting of the first PS service and the second PS service comprises an ongoing PS service, the method comprising detecting, at an element selected from the group consisting of a modem and an application layer logic, a priority of the ongoing PS service based on a type of the ongoing PS service.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example ay be referred to herein along with alternatives for the various components thereof. It is understood that such embodiments, examples, and alternatives are not to be construed as defacto equivalents of one another, but are to be considered as separate and autonomous representations.

Furthermore, the described features, structures, or characteristics may be combined in any suitable manner in one or more embodiments.

In the foregoing description, numerous specific details are provided, such as examples of layouts, distances, network examples, etc., to provide a thorough understanding of some demonstrative embodiments. One skilled in the relevant art will recognize, however, that some embodiments can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of some embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. A multiple subscriber identity module (SIM)s radio configured to control a SIM operation state, the multiple SIMs radio comprising:
    transmitter circuitry configured to transmit communications of an active packet switch (PS) service;
    receiver circuitry configured to receive communications of the active PS service; and
    processor circuitry configured to determine a priority of a first PS service operating on a first SIM and a priority of a second PS service to operate on a second SIM, and to activate the second PS service and suspend the first PS service, if the priority of the second PS service is higher than the priority of the first PS service, the processor circuitry configured to set a radio resource control connection (RRC) with a base station, to receive an Internet Protocol (IP) packet, to inspect the IP packet, and to determine the priority of the second PS service based on at least one parameter selected from the group consisting of a source IP address, a source port, a destination port, a transport protocol, and a session protocol.

2. The multiple SIMs radio of claim 1, wherein the processor circuitry is configured to detach the first SIM from the transmitter circuitry and to connect the second SIM to the transmitter circuitry.

3. The multiple SIMs radio of claim 1, wherein the processor circuitry is configured to detect a type of the first PS service and to determine the priority of the first PS service based on the type of the first PS service, and to detect a type of the second PS service and to determine the priority of the second PS service based on the type of the second PS service.

4. The multiple SIMs radio of claim 1, wherein said receiver circuitry is configured to receive a PS paging signal indicating arrival of the second PS service, the processor circuitry configured to detect a type of the second PS service based on content of the PS paging signal, and to determine the priority of the second PS service based on the type of the second PS service.

5. The multiple SIMs radio of claim 1, wherein the processor circuitry is configured to detect a priority of an ongoing PS service based on the type of the ongoing PS service.

6. The multiple SIMs radio of claim 5, wherein the processor is configured to detect the priority of the ongoing PS service at a modem.

7. The multiple SIMs radio of claim 5, wherein the processor circuitry is configured to detect the priority of the ongoing PS service at an application layer.

8. A multiple subscriber identity module (SIM)s radio configured to control a SIM operation state, the multiple SIMs radio comprising:
    transmitter circuitry configured to transmit communications of an active packet switch (PS) service;

receiver circuitry configured to receive communications of the active PS service; and processor circuitry configured to determine a priority of a first PS service operating on a first SIM and a priority of a second PS service to operate on a second SIM, and to activate the second PS service and suspend the first PS service, if the priority of the second PS service is higher than the priority of the first PS service, the processor circuitry configured to detect a type of the second PS service based on a data radio bearer (DRB) identification (ID), and to determine the priority of the second PS service based on the type of the second PS service.

9. The multiple SIMs radio of claim 8, wherein the processor circuitry is configured to set a radio resource control connection (RRC) with a base station, to identify a reception of a user data, and to determine a priority of an incoming PS service based on content of the user data.

10. The multiple SIMs radio of claim 8, wherein the processor circuitry is configured to detect the type of the second PS service based on inspection of a first received data packet.

11. The multiple SIMs radio of claim 8, wherein the processor circuitry is configured to detach the first SIM from the transmitter circuitry and to connect the second SIM to the transmitter circuitry.

12. A processor circuitry configured to control a subscriber identity module (SIM) operation state at a multiple SIMs radio, the processor circuitry comprising:

an application layer logic to include a user application;

a packet switch (PS) service policy manager logic configured to determine a priority of a first PS service operating on a first SIM and a priority of a second PS service to operate on a second SIM, and to activate the second PS service and suspend the first PS service, if the priority of the second PS service is higher than the priority of the first PS service, the second PS service comprises an incoming PS service, the PS service policy manager logic configured to detect a type of the second PS service based on content of a PS paging signal; and a Transmission Control Protocol/User Datagram Protocol (TCP/UDP) protocol stack logic configured to identify reception of the incoming PS service at an access point name (APN) of an evolved packet system (EPS) data radio bearer (DRB) identification (ID), after setting up a radio resource control connection (RRC) with a base station, the PS service policy manager logic configured to detect a type of the incoming PS service based on the EPS DRB identification.

13. The processor circuitry of claim 12, wherein the PS service policy manager logic is configured to detect a type of the first PS service and to determine the priority of the first PS service based on the type of the first PS service, and to determine the priority of the second PS service based on the type of the second PS service.

14. The processor circuitry of claim 12, wherein the first PS service comprises an ongoing PS service, the PS service policy manager logic configured to detect the priority of the first PS service based on a type of the first PS service.

15. The processor circuitry of claim 12, wherein the PS service policy manager logic is configured to detach the first SIM from a transmitter circuitry and to connect the second SIM to the transmitter circuitry.

16. A processor circuitry configured to control a subscriber identity module (SIM) operation state at a multiple SIMs radio, the processor circuitry comprising:

an application layer logic to include a user application;

an Internet protocol stack logic configured to inspect a received Internet Protocol (IP) packet for a source IP address, a source port, a destination port, a transport protocol, and a session protocol; and a packet switch (PS) service policy manager logic configured to determine a priority of a first PS service operating on a first SIM and a priority of a second PS service to operate on a second SIM, and to activate the second PS service and suspend the first PS service, if the priority of the second PS service is higher than the priority of the first PS service, the second PS service comprises an incoming PS service, the PS service policy manager logic configured to detect a type of the second PS service based on content of a PS paging signal, the PS service policy manager logic configured to determine a PS service priority based on at least one parameter selected from the group consisting of the source IP address, the source port, the destination port, the transport protocol, and the session protocol.

17. The processor circuitry of claim 16, wherein the first PS service comprises an ongoing PS service, the PS service policy manager logic configured to detect the priority of the first PS service based on a type of the first PS service.

18. The processor circuitry of claim 17, wherein the PS service policy manager logic is configured to detect the ongoing PS service at a modem.

19. The processor circuitry of claim 17, wherein the PS service policy manager logic is configured to detect the ongoing PS service at the application layer logic.

20. A computer program product comprising one or more tangible computer readable non-transitory storage media comprising computer-executable instructions operable to, when executed by at least one computer processor, enable the at least one computer processor to implement operations at a multiple subscriber identity module (SIMs) radio, the operations comprising:

setting a radio resource control connection (RRC) with a base station;

while operating a first packet switch (PS) service on a first SIM, receiving a second PS service configured to operate on a second SIM;

determining a priority of the first PS service, and a priority of the second PS service, determining the priority of the second PS service comprises inspecting a received Internet Protocol (IP) packet to determine the priority of the second PS service based on at least one parameter selected from the group consisting of a source IP address, a source port, a destination port, a transport protocol, and a session protocol; and activating the second SIM, if the priority of the second PS service is higher than the priority of the first PS service.

21. The computer program product of claim 20, wherein activating the second SIM comprises:

suspending the first PS service at the first SIM;

detaching the first SIM from a transmitter circuitry; and connecting the second SIM to the transmitter circuitry.

22. The computer program product of claim 20, wherein the operations comprise:

detecting a type of the first PS service, and determining the priority of the first PS service based on the type of the first PS service; and detecting a type of the second PS service, and determining the priority of the second PS service based on the type of the second PS service.

23. The computer program product of claim 20, wherein the second PS service comprises an incoming PS service, the operations comprising:
- receiving a PS paging signal indicating arrival of the second PS service;
- detecting a type of the second PS service based on a content of the PS paging signal; and
- determining the priority of the second PS service based on the type of the second PS service.

24. The computer program product of claim 20, wherein at least one PS service selected from the group consisting of the first PS service and the second PS service comprises an ongoing PS service, the operations comprising:
- detecting, at an element selected from the group consisting of a modem and an application layer logic, a priority of the ongoing PS service based on a type of the ongoing PS service.

* * * * *